Nov. 21, 1972 — C. A. RIGSBY, SR — 3,703,589
BATTERY AND METHOD OF MAKING THE SAME
Original Filed June 7, 1962 — 2 Sheets-Sheet 1
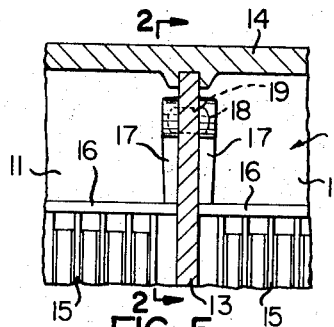
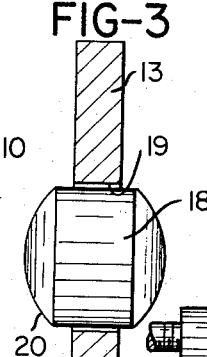
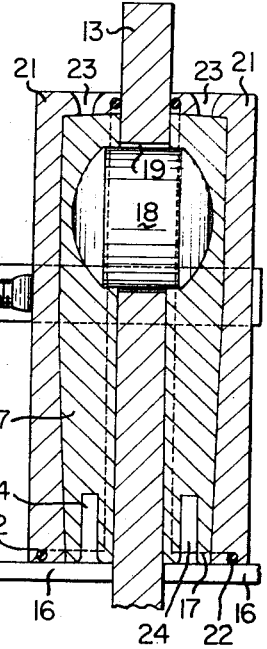
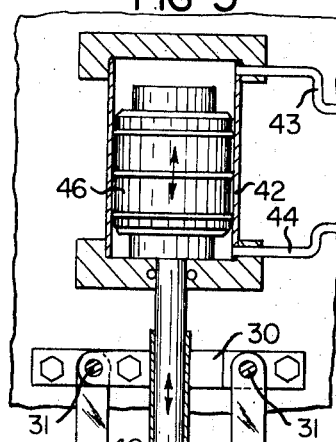
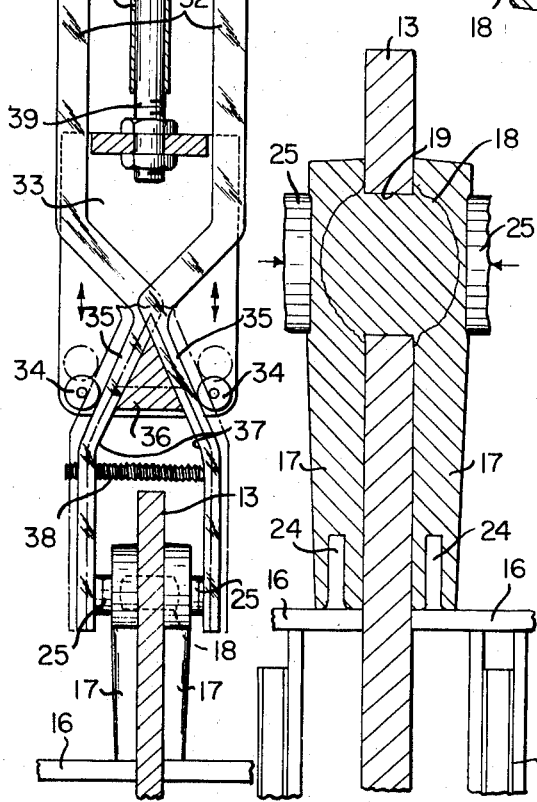
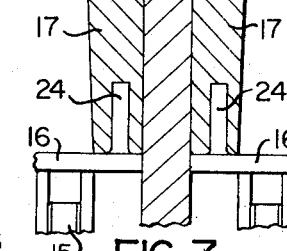
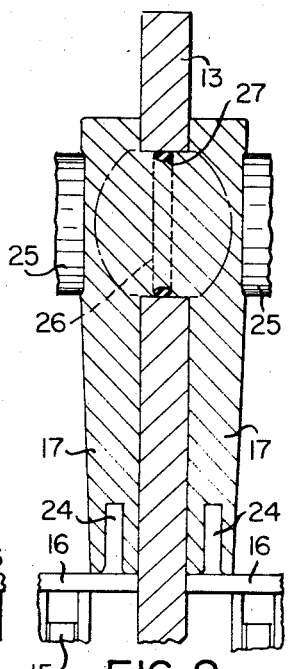
INVENTOR.
CANBY A. RIGSBY Sr.

Nov. 21, 1972                C. A. RIGSBY, SR                3,703,589
BATTERY AND METHOD OF MAKING THE SAME
Original Filed June 7, 1962                2 Sheets-Sheet 2
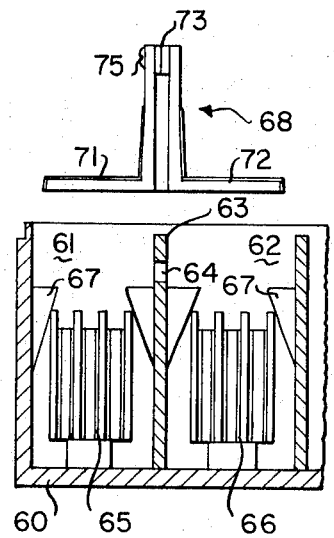
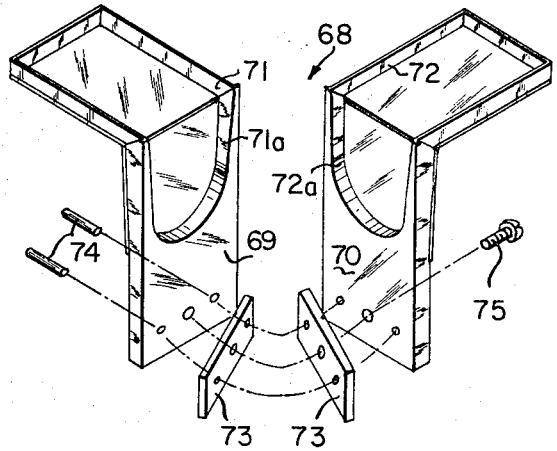
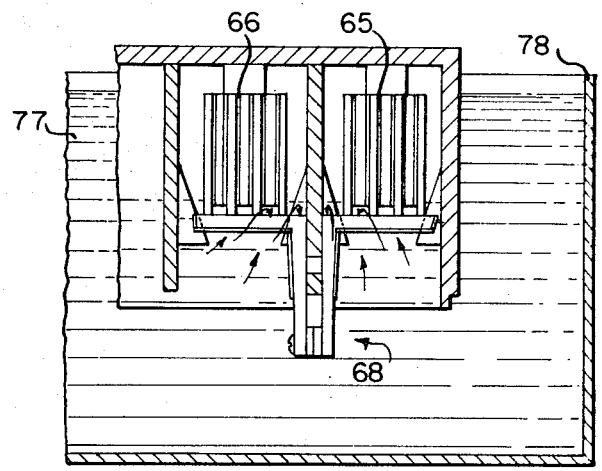
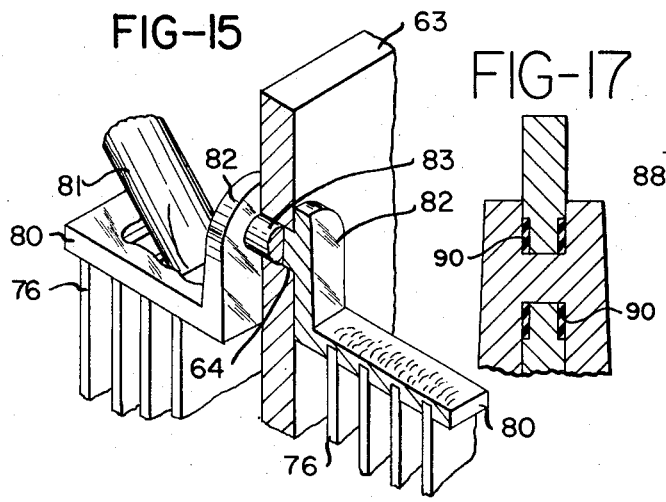
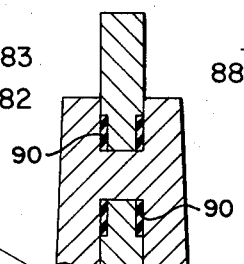
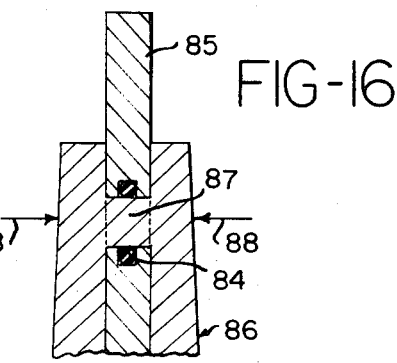
INVENTOR.
CANBY A. RIGSBY Sr.
BY United States Patent Office
3,703,589
Patented Nov. 21, 1972

3,703,589
BATTERY AND METHOD OF MAKING THE SAME
Canby A. Rigsby, Jr., Elmwood, Ind., assignor to Globe-Union Inc., Milwaukee, Wis.
Continuation of application Ser. No. 200,713, June 7, 1962. This application Dec. 20, 1965, Ser. No. 520,300
Int. Cl. H01m 5/00, 35/32
U.S. Cl. 136—134 R
23 Claims

ABSTRACT OF THE DISCLOSURE

A storage battery having at least two cells separated by a partition with an intercell connector extending through the partition near the top and consisting of an integral mass of metal connected to the plates of one cell or one side of the partition and to the plates of the other cell on the other side of the partition and leading sealingly through the partition.

The present application is a continuation application of my copending application Ser. No. 200,713 filed June 7, 1962, now abandoned. Subsequent to filing this continuation application, I filed a continuing application, i.e., Ser. No. 74,272, filed Sept. 22, 1970.

This invention relates to batteries and to a novel method of making batteries and to an apparatus for carrying out the method of the present invention.

Batteries of the wet cell type such as are employed in automotive vehicles and many other instances, are generally composed of a plurality of individual cells arranged within a compartment case while connections extend on the outside of the battery between the plates of adjacent compartments.

Many attempts have been made to connect plates in adjacent cells of a battery of this nature through a partition wall separating the compartments, in other words, within the battery, but these efforts have not always been successful on account of the difficulty of effecting a satisfactory seal between the partition and connecting means and because of the difficulty is effecting good eelctrical connection from the plates on one side of the partition to the plates on the other side.

In my earlier Pat. No. 2,906,804, now reissued as Re. 25,054, I show an arrangement wherein a conductive pin is arranged through an aperture in a partition wall and is then expanded into electrical contact and sealing engagement with lugs extending from the plates upwardly along opposite sides of the partition wall.

The present invention concerns the idea of expanding a connecting element within an aperture in a battery partition wall but involves different inventive concepts than in the patent referred to above and represents a substantial improvement in the art thereover.

The present invention therefore has a primary object the provision of an improved battery construction of the wet cell-multi-cell type having connections between adjacent cells extending through the partition wall separating the cells.

Still another object is the provision of an improved method of manufacturing multi-cell batteries in which connections between adjacent cells pass through the partition wall separating the cells.

Still a further object of this invention consists in the provision of a simple apparatus for expanding the connecting member leading through the partition wall into sealing engagement with the partition wall.

It is a still further object of this invention to provide a novel battery structure and a method of manufacturing the battery in which a connection between adjacent cells is provided which extends through the partition wall between the cells and in which effective sealing engagement of the connecting means with the partition wall is effected without developing excessive pressure between the connecting means and the partition wall.

These and other objects and advantages of the invention will appear more clearly from the following specification in connection with the accompanying drawings, in which:

FIG. 1 is a fragmentary view showing a fragment of a battery constructed according to my invention and illustrating the connection leading through a partition wall of the battery case between adjacent cells.

FIG. 2 is a sectional view taken along the line 2—2 of FIG. 1 and showing the arrangement of a connecting member forming a part of the connection between the adjacent cells.

FIG. 3 is a fragmentary view drawn at an enlarged scale and showing how a connecting pin forming a part of the connection between adjacent cells is disposed in an aperture in a partition wall.

FIG. 4 illustrates a manner of pouring or casting connecting members leading from the pin, that extends through the partition wall, to battery plates on opposite sides of the partition wall.

FIG. 5 is a rather diagrammatic view showing a device for applying pressure to the connecting pin and the cast members for expanding the pin into sealing engagement with the wall of the aperture in the partition wall.

FIG. 6 is a view showing the connecting pin being compressed and expanded into engagement with the partition wall.

FIG. 7 is a view showing a modified arrangement wherein the connecting pin is provided with an intermediate groove for receiving a rubber-like sealing ring.

FIG. 8 is a view showing the modification of FIG. 7 with the pin being compressed axially and expanded radially to effect sealing engagement of the pin and the sealing ring with the wall of the aperture in the partition member.

FIG. 9 is a fragmentary view drawn at a somewhat enlarged scale and showing the groove in the connecting pin and a sealing ring therein prior to expansion of the pin.

FIG. 10 is a view similar to FIG. 9 but shows the pin expanded and in sealing engagement with the wall of the aperture in the partition wall.

FIG. 11 is a section of a modified arrangement.

FIG. 12 is a sectional view of the mold used with the FIG. 11 modification.

FIG. 13 is a sectional view showing the mold in place on a battery case partition.

FIG. 14 is a sectional view showing the battery being dipped into molten metal to cast the connection between adjacent cells and plates.

FIG. 15 is a fragmentary perspective view showing a finishing operation.

FIG. 16 is a sectional view showing a completed connection, and

FIG. 17 is a sectional view of a modification.

Referring now to the drawings in detail and FIGS. 1 and 2 thereof in particular, the battery case 10 shown therein has compartments 11 and 12 separated from each other by a partition wall 13. A cover member 14 closes the top of the battery. Each of the compartments 11 and 12 comprises battery plates 15 in such an arrangement that alternate plates in each compartment are electrically interconnected by a crossbar 16.

According to the invention, conductive bar-like members 17 extend upwardly from bars 16 on opposite sides of partition wall 13 and are electrically interconnected at their upper ends by conductive pin means 18 which extend through an aperture 19 in the partition wall. In this way, a good electrical connection is formed between plates of adjacent compartments or cells which eliminate exposed terminals on top of the battery, provides for a lower resistance connnection between adjacent cells, and is more economical in use of material than prior art arrangements.

As will be seen from FIG. 3, the pin means 18 is received in aperture 19 of partition wall 13 and has rounded end portions 20 extending outwardly beyond the limits of the partition wall.

Furthermore, in conformity with the present invention, the bar-like connector members 17 are provided by casting them in place directly in the battery structure. This is accomplished by means of mold members 21 (FIG. 4) which fit against the partition wall 13 and the lower ends of which open to the tops of the bars 16. Sealing means as at 22 may be provided to prevent flashing of molten material from the molds.

When the molds are arranged as indicated in FIG. 4, molten metal, such as lead, is poured into the molds through the openings 23. This molten metal fuses with the end portions 20 of pin means 18 and also fuses to bars 16. The fusing to bars 16 may be facilitated by providing bars 16 with projections 24 which extend upwardly into the lower ends of the mold cavities.

When the molten material has solidified, the molds are removed and this will leave the bars 16 on opposite sides of the partition wall each integrally joined with an upwardly extending bar member 17, said bar members being toward their upper ends integrally joined by the pin means 18.

According to the present invention, the now integral connecting means extending from one bar 16 through the partition wall to the other bar 16 are sealed to the partition wall by applying pressure through the bar-like members 17 to opposite ends of the pin means 18 to thereby compress the pin means axially and to expand it radially into sealing engagement with the peripheral wall of aperture 19 and the bar-like members 17 into sealing engagement with opposite sides of the partition wall 13. This last mentioned step is accomplished by pressing anvil means 25 inwardly toward each other as illustrated in FIG. 6 and controlling the application of pressure and the act of collapsing axially of pin means 18 so as to produce the proper degree of radial expansion thereof to bring the pin means 18 into sealing engagement with the wall of aperture 19 while still preventing the development of enough pressure on the partition wall to cause breaking thereof.

In this connnection it will be appreciated that the bar-like members 17 are also placed toward the partition wall and engage the partition wall over a predetermined region surrounding the said aperture so that the partition wall is confined and reinforced and thereby supported against breakage which might occur if pressure were applied to the pin means 18 in the absence of the said bar-like members 17.

I found that pin means 18 could be provided with an intermediate annular groove 26 as illustrated in FIG. 7 if so desired. This is of some benefit in making it easier to collapse the pin means in the axial direction and also tends to cause pin means 18 to expand in the region of the groove before it expands toward the end portion thereof thus further reducing the possibility of breakage of the partition wall.

It is also of advantage to mount a resilient annular sealing ring 27 in groove 26, said sealing ring may be made of rubber or rubber-like material, or of silicone rubber and may be round, square, or rectangular in cross section or it may be sleeve-shaped and extend the full length of aperture 19 which could, in such a case, be without groove 26.

Sealing ring 27, upon axial collapse of the pin means, will extend radially into sealing engagement with the wall of the aperture 19 and provide an effective seal between the pin means and in the aperture even in the absence of direct engagement of the pin means 18 with the aperture. Also, with the pin means 18 in expanded position, as illustrated in FIG. 8, the pin means itself can engage the wall of the aperture with very little pressure and an adequate seal is still effected.

FIG. 9 shows how the sealing ring 27 can be arranged so as to be in engagement with the partition wall 13 prior to the expansion of the pin means 18, and FIG. 10 shows somewhat diagrammatically the appearance of the assembly after the pin means 18 has been radially expanded and at which time the sealing ring 27 is compressed into tight sealing engagement with the partition wall 13.

The device by means of which the collapsing pressure is applied to the pin means 18 is diagrammatically illustrated in FIG. 5. This view shows a carrier 30 having pivoted thereto, as at 31, a pair of levers 32 which on the inner faces of their outer ends carry the anvil means 25. Associated with the levers is a reciprocable frame 33 having rollers 34 engaging inclined surfaces 35 on the outside faces of levers 32, which surfaces diverge toward the anvil portions 25.

Downward movement of frame 33 will thus cause rollers 34 to force the outer ends of the lever toward each other so as to compress therebetween the pin means or the like placed between anvils 25. Upon movement of frame 33 in the opposite direction, a cam member 36 carried by the frame 33 engages the inner inclined surfaces 37 of levers 32 and moves the levers apart.

An adjustable abutment screw 38 carried by one of the levers 32 is arranged to abut the other lever 32 so that the amount of collapsing in the axial direction of the pin means 18 can be exactly controlled which, in turn, will exactly control the radial expansion of the pin means and thereby prevent the development of excessive pressure between the pin means and the partition wall 13.

For purposes of reciprocating frame 33 there is connected thereto a rod 39 guided in a sleeve 40 attached to carrier 30, said rod being connected to piston 41 reciprocably mounted in a cylinder 42. Cylinder 42 is adapted to be reversibly supplied with hydraulic fluid via conduits 43 and 44 which lead to the service ports of a reversing valve 45. Valve 45 has a pressure supply conduit 46 and exhaust conduit means 47 and a valve member 48 that is movable for controlling the connections between the several conduits. The degree of collapsing of the pin means may also be controlled by raising or lowering the hydraulic pressure delivered to valve 45, or by controlled mechanical cam or spring force applied to rod 39.

The arrangement of the present invention is operable for producing connections between the adjacent cells of wet batteries which connections are highly efficient electrically and which are economical in conserving material.

The connections provide adequate seals between adjacent cells and eliminate exposed connections, such as are conventionally found on the tops of wet cell batteries.

A simple mechanism can be employed for expanding the connecting pin means and such mechanism may well be included in an automated production line.

By providing for expansion of the connecting pin means to make the seal between adjacent cells, and by pouring the bar members on opposite sides of the partition wall, the manufacture of the battery is facilitated and made quite rapid.

The particular material of the pin means and the vertical connecting bars 17 is, of course, some good electrically conductive material which is readily deformed, lead for example, although it may be desirable to provide a lead alloy, such as a lead antimony, in order to provide for the desired degree of hardness for the said connecting bar-like members and connecting seal means.

FIGS. 11 through 16 show a modified arrangement in which the entire connector element is cast in situ in the battery case. This is done by putting the plates in the cells on opposite sides of a partition and aperturing the partition, and then placing a mold on the partition, into which the material making up the connector is cast.

In these figures, a portion of the battery case is indicated at 60 and, for the sake of simplicity, there are shown only two cells 61 and 62 separated from each other by a partition wall 63 that has an aperture 64 formed therein toward the top. The battery plates that go into the cells are indicated at 65 and 66. These plates are put in place and are wedged or otherwise secured in their proper positions by wedge elements 67.

After the plates have been put into place, a mold 68 is placed over the wall 63 and it is into this mold that the connector is cast. The mold, as will be seen in FIG. 12, comprises a pair of L-shaped members 69 and 70 which have recesses 71 and 72 for receiving the casting material. The mold parts are placed together with the spacers 73 therebetween and are doweled together as by dowels 74 and are made rigid with each other by screws 75. Spacers 73 permit adjustment of the mold to different partition thicknesses. When the partition thickness does not change, the mold may be a one-piece member.

The recesses 71 and 72 comprise portions 71a and 72a which extend along opposite sides of wall 63 from opposite ends of aperture 64, as will be seen in FIG. 13. The recesses also comprise the portions 71b and 72b which extend along and enclose tongues 76 extending upwardly from the top edges of the battery plates.

The mold fits snugly against opposite sides of the partition wall so that upon inversion of the battery case when the mold is in place, there will be confined a space into which molten metal, such as a lead alloy, can be introduced to form the connector.

FIG. 14 shows the battery case inverted and with the mold 68 in place and with the battery case being introduced into the molten metal 77 contained in the pot 78. The battery case is immersed in the metal until the metal will flow into the mold 68 and form the connector therein. I have found that a molten alloy at 750° F. will produce a satisfactory connector when the case is placed therein for a period of about five seconds. Also various other temperature-time relations have produced satisfactory connectors under various circumstances. The case could be apertured to release air therefrom during casting and the aperture sealed closed after casting or by incorporating U-shaped venting tubes put in place with the molds or even being part of the molds.

The battery case, following the casting, is withdrawn from the molten metal and is again turned upright and the mold can then be drawn off the cast connector.

As will be seen from the drawings, the recess in the mold is provided with ample draft to permit it to be drawn from the cast connector.

In certain instances, the tongues 76 may project through the horizontal bar portions 80 of the connector, and when this occurs, a soldering iron 81 can be employed for flowing molten solder over the upper ends of the tongues 76, or they may be fused by "lead burning," thereby absolutely to insure a good electrical connection of the tongues with the said horizontal bar portions. This is illustrated in FIG. 15, where in will also be observed that the connector also includes the vertical bar portions 82 engaging opposite sides of wall 63, and pin means 83 extending through aperture 64, and electrically interconnecting bar portions 82.

As will be seen from FIG. 16, a sealing ring 84, having a round, square, or rectangular cross section, could be placed in the bore in the partition wall, either in a groove in the partition wall or merely engaging the partition wall by friction and then, upon casting the connector in place, a good seal of the connector with the partition wall will be had. Also a sleeve-shaped ring running the full length of the bore could be used.

In FIG. 16, the partition wall is indicated at 85 and the connector at 86 which latter includes the pin portion or pin means 87.

As in the case of the first described modification, pressure could be applied to opposite sides of the connector in axial alignment with the pin portion or pin means, as indicated by arrows 88 in FIG. 16, whereby the vertical bar portions are tightly pressed against and in sealing engagement with the opposite sides of the partition wall while the pin portion or pin means 87 is pressed into intimate sealing engagement with the periphery of the aperture in the partition wall.

FIG. 17 shows how rubber-like washers 90 could be placed on opposite sides of the partition to augment the sealing action when the pin is compressed.

It will be understood that this invention is susceptible to modification in order to adapt it to different usages and conditions and accordingly, it is desired to comprehend such modifications within this invention as may fall within the scope of the appended claims.

What I claim is:

1. A method of electrically interconnecting battery plates on opposite sides of the partition wall of a compartmented battery case, which includes the steps of: forming an aperture in that portion of the partition wall which in normal use position of the battery forms the upper end of said partition wall, placing first electrically conductive means in said aperture and casting second electrically conductive means in situ on opposite sides of said partition wall with said second electrically conductive means in electrically conductive engagement with said first electrically conductive means and having electric connection with said plates, applying pressure through said second conductive means from opposite sides of said partition wall upon said first conductive means to thereby deform said first conductive means into sealing engagement with the partition wall portion defining said aperture, forming a peripheral groove in said first electrically conductive means, and inserting a ring of resilient rubber-like material into said groove prior to placing said first electrically conductive means in said aperture.

2. A method of electrically interconnecting battery plates on opposite sides of the partition wall of a compartmented battery case, which includes the steps of: forming an aperture in that portion of the partition wall which in normal use position of the battery forms the upper end of said partition wall, placing first electrically conductive means in said aperture and casting second electrically conductive means in situ on opposite sides of said partition wall with second electrically conductive means in electrically conductive engagement with said first electrically conductive means and having electric connection with said plates, applying pressure through said second conductive means from opposite sides of said partition wall upon said first conductive means to thereby deform said first conductive means into sealing engagement with the partition wall portion defining said aperture, said electrically conductive means being formed by placing the battery plates to be connected in cells of the battery case on opposite sides of said partition wall, placing mold means on said partition wall so as to confine therewith a space on each side of said partition wall and around top portions of said plates on each side of said partition wall with said spaces communicating with each other through said aperture, filling the so defined space with molten metal, permitting the molten metal to solidify, and removing the said mold means from said partition wall whereby the metal solidified in said mold means and in the said aperture forms said first and second electrically conductive means as a single integral casting.

3. A method according to claim 2 which includes the steps of: inverting said battery base while said mold means are on said partition wall, and introducing the inverted case together with said mold means into molten metal to fill said mold means.

4. The method of electrically interconnecting battery plates on opposite sides of the partition wall of a compartmented battery case which comprises: placing a conductive pin in an aperture extending through the wall, casting conductive members from the ends of the pin to the plates on opposite sides of the partition wall, and applying pressure through said members to the axially opposite ends of the pin to deform the pin into sealing engagement with the wall of the aperture.

5. The method of electrically interconnecting battery plates on opposite sides of the partition wall of a compartmented battery case which comprises: placing a conductive pin in an aperture extending through the wall, said pin having an annular groove therein intermediate the ends, casting conductive members from the ends of the pin to the plates on opposite sides of the partition walls, and applying pressure through said members to the axially opposite ends of the pin to deform the pin into sealing engagement with the wall of the aperture, while simultaneously forcing at least the portions of said members in the region of said pin into firm and sealing engagement with the said partition wall.

6. The method of electrically interconnecting battery plates on opposite sides of the partition wall of a compartmented battery case which comprises: placing a conductive pin in an aperture extending through the wall, said pin having an annular groove therein intermediate the ends and a resilient rubber-like seal ring in said groove, casting conductive members on opposite sides of the partition wall each fused to one end of the pin and battery plates on the same side of the partition wall, and applying pressure through said members to the opposite ends of the pin to deform the pin and force at least the said ring radially outwardly into sealing engagement with the wall of the aperture.

7. The method of electrically interconnecting battery plates on opposite sides of the partition wall of a compartmented battery case which comprises: placing a conductive pin in an aperture extending through the wall, said pin having an annular groove therein intermediate the ends and a resilient rubber-like seal ring in said groove, casting conductive members on opposite sides of the partition wall each fused to one end of the pin and battery plates on the same side of the partition wall, and applying pressure through said members to the opposite ends of the pin to deform the pin and force at least the said ring radially outwardly into sealing engagement with the wall of the aperture, while simultaneously forcing at least the portions of said members in the region of said pin into firm and sealing engagement with said partition wall.

8. A method of casting cell connectors in a battery case comprising: placing the plates to be connected in cells of the battery case on opposite sides of a partition wall having an aperture, placing a mold on the wall which confines a space on each side of the wall and around projections on the tops of the plates on each side of the wall with the spaces communicating through said aperture, inverting the battery case, and introducing the inverted case into molten metal to fill said mold.

9. A method of casting cell connectors in a battery case comprising: placing the plates to be connected in cells of the battery case on opposite sides of a partition wall having an aperture, placing a metallic connecting pin in said aperture, placing a mold on the wall which confines a space on each side of the wall and around projections on the tops of the plates on each side of the wall, inverting the battery case, and dipping the inverted case into molten metal at a controlled temperature for a predetermined period to fill the mold.

10. A method of casting cell connectors in a battery case comprising: placing the plates to be connected in cells of the battery case on opposite sides of a partition wall having an aperture, placing a sealing ring in said aperture between the ends thereof, placing a mold on the wall which confines a space on each side of the wall and around projections on the tops of the plates on each side of the wall with the spaces communicating through said aperture, inverting the battery case, and introducing the inverted case into molten metal to fill said mold.

11. A method of casting cell connectors in a battery case comprising: placing the plates to be connected in cells of the battery case on opposite sides of a partition wall having an aperture, placing a mold on the wall which confines a space on each side of the wall and around projections on the tops of the plates on each side of the wall with the spaces communicating through said aperture, inverting the battery case, introducing the inverted case into molten metal to fill said mold, removing the case from the molten metal, removing the mold, and deforming the pin portion of the connector that passes through the aperture into tight engagement therewith by applying pressure to the connector at opposite ends of the pin portion, and simultaneously forcing at least the portion of conducting members in the region of said pin into firm and sealing engagement with said partition wall.

12. A method according to claim 4 wherein during said casting there is fusing of the conductive members to one end of the pin and battery plates on the same side of the partition wall respectively.

13. The method of electrically interconnecting battery plates on opposite sides of the partition wall of a compartmented battery case which comprises: placing a conductive pin in an aperture extending through the wall, said pin having an annular groove therein intermediate the ends, casting conductive members on opposite sides of the partition wall each fused to one end of the pin and battery plates on the same side of the partition wall, and applying pressure through said members to the opposite ends of the pin to deform the pin and force at least a separated periphery of the pin radially outwardly into sealing engagement with the wall of the aperture, while simultaneously forcing at least the portion of conducting members in the region of said pin into firm and sealing engagement with said partition wall.

14. The method of electrically interconnecting battery plates on opposite sides of the partition wall of a compartmented battery case which comprises: placing a conductive pin in an aperture extending through the wall, said pin having an annular groove therein intermediate the ends, casting conductive members from the ends of the pin to the plates on opposite sides of the partition wall, and applying pressure through said members to the axially opposite ends of the pin to deform the pin into sealing engagement with the wall of the aperture.

15. A method of casting cell connectors in a battery case comprising: placing the plates to be connected in cells of the battery case on opposite sides of a partition wall having an aperture, placing a mold on the wall which confines a space on each side of the wall and around projections on the tops of the plates on each side of the wall with the spaces communicating through said aperture, inverting the battery case, and dipping the inverted case into molten lead at a controlled temperature for a predetermined period to fill the mold.

16. A method of casting cell connectors in a battery case comprising: placing the plates to be connected in cells of the battery case on opposite sides of a partition wall having an aperture, placing a mold on the wall which confines a space on each side of the wall and around projections on the tops of the plates on each side of the wall with the spaces communicating through said aperture, inverting the battery case, introducing the inverted case into molten metal to fill said mold, removing the case from the molten metal, removing the mold, and expanding the pin portion of the connector that passes through the aperture into tight sealing engagement therewith by applying pressure to the connector at opposite ends of the pin portion.

17. A method of casting cell connectors in a battery case comprising: placing the plates to be connected in cells of the battery case on opposite sides of a partition wall having an aperture, placing in said aperture between the ends thereof and in engagement with the periphery of the aperture a sealing ring which will adhere to at least one of the said wall and pin at the temperature of the molten metal to be employed for casting the connector, placing a mold on the wall which confines a space on each side of the wall and around projections on the tops of the plates on each side of the wall with the spaces communicating through said aperture, inverting the battery case, and introducing the inverted case into molten metal to fill said mold.

18. A method of casting cell connectors in a battery case comprising: placing the plates to be connected in cells of the battery case on opposite sides of a partition wall having an aperture, placing a mold on the wall which confines a space on each side of the wall and around projections on the tops of the plates on each side of the wall with the spaces communicating through said aperture, inverting the battery case, introducing the inverted case into molten metal to fill said mold, removing the case from the molten metal, removing the mold from the said wall and the cast connector, and fusing portions of said projections which project through the cast connector to the portions of the cast connector adjacent thereto.

19. A battery case having at least two adjacent compartments therein and a partition wall therebetween and also having therein battery plates on opposite sides of said partition wall, said partition wall having an aperture therethrough near that portion of said partition wall which in use position of said battery forms the top portion of said partition wall, electrically conductive pin means extending through said aperture, seal means sealing said pin means to that wall portion of said partition wall which forms the peripheral wall of said aperture, electrically conductive connecting means consisting of cast metal and extending between and in electrically conductive engagement with said battery plates and said pin means, the density of the material of said pin means and of the immediately adjacent portion of said connecting means being greater than that of the remaining portions of said connecting means, said pin means having an annular groove therein, and said seal means comprising a ring of rubber-like material mounted in said groove.

20. A battery case having at least two adjacent compartments therein and a partition wall therebetween and also having therein battery plates on opposite sides of said partition wall, said partition wall having an aperture therethrough near that portion of said partition wall which in use position of said battery forms the top portion of said partition wall, electrically conductive pin means extending through said aperture, seal means sealing said pin means to that wall portion of said partition wall which forms the peripheral wall of said aperture, electrically conductive connecting means consisting of cast metal and extending between and in electrically conductive engagement with said battery plates and said pin means, the density of the material of said pin means and of the immediately adjacent portion of said connecting means being greater than that of the remaining portions of said connecting means, that wall surface of said partition wall which forms the peripheral wall of said aperture having an annular groove therein, and said seal means comprises a ring of rubber-like material located in said groove.

21. An intercell connection between battery cell element assemblies disposed on opposite sides of the battery partition wall having an opening therethrough and wherein said conductive straps each include generally planar surfaces facing said partition wall, said intercell connection comprising: means defining an opening in each of said conductive straps opening through said planar surfaces and arranged in alignment with said partition wall opening, pin means disposed in said conductive strap and partition wall openings, said pin means characterized by having a volume of material in said partition wall opening which is less than the volume defined by said partition wall opening, means electrically and mechanically connecting said pin means to each of said conductive straps, and wherein said generally planar surfaces are disposed in intimate sealing engagement with said partition wall around said partition wall opening.

22. The intercell connection of claim 21 wherein said pin means is further characterized by having a point of relatively high electrical resistance disposed in said partition wall opening.

23. In a battery: a battery case having compartments for receiving battery plates and insulating partition walls separating said compartments from each other, each partition wall having an aperture near the top, a conductive pin mounted in said aperture, an annular groove in the pin intermediate the ends thereof, a resilient rubber-like ring in said groove for effecting sealing engagement with the wall of said aperture, and conductive bar members fused to opposite ends of said pin and extending downwardly therefrom into electrical engagement with battery plates on opposite sides of the partition wall.

References Cited
UNITED STATES PATENTS

| | | | |
|---|---|---|---|
| 1,882,414 | 10/1932 | Ford | 136—134 |
| 2,002,267 | 5/1935 | Kyle | 136—134 |
| 2,221,542 | 11/1940 | Hopkins | 136—134 UX |
| 3,313,658 | 4/1967 | Sabatino et al. | 136—134 |

DONALD L. WALTON, Primary Examiner

U.S. Cl. X.R.

136—176

UNITED STATES PATENT OFFICE
CERTIFICATE OF CORRECTION

Patent No. 3,703,589          Dated November 21, 1972

Inventor(s) Canby A. Rigsby, Sr.

It is certified that error appears in the above-identified patent and that said Letters Patent are hereby corrected as shown below:

Column 1, line 4, change "Canby A. Rigsby, Jr." to --Canby A. Rigsby, Sr.--;

Column 1, line 4, change "Elmwood" to --Elwood--;

Column 1, line 44, change "is" to --in--;

Column 1, line 45, change "eelctrical" to --electrical--;

Column 3, line 4, change "eliminate" to --eliminates--;

Column 5, line 63, change "in" to --it--;

Column 6, line 72, change "base" to --case--;

Column 7, line 17, change "walls" to --wall--.

Signed and sealed this 1st day of May 1973.

(SEAL)
Attest:

EDWARD M. FLETCHER, JR.      ROBERT GOTTSCHALK
Attesting Officer             Commissioner of Patents